United States Patent [19]

Lakin

[11] Patent Number: 5,043,612

[45] Date of Patent: Aug. 27, 1991

[54] EPOXY COATED MOTOR WITH SHADING BAND HAVING TAPERED EDGES

[75] Inventor: Bryan L. Lakin, Nixa, Mo.

[73] Assignee: Fasco Industries, Inc., Lake Forest, Ill.

[21] Appl. No.: 512,350

[22] Filed: Apr. 23, 1990

[51] Int. Cl.$^5$ ............................................ H02K 17/10
[52] U.S. Cl. ...................................... 310/45; 310/172
[58] Field of Search .................... 310/45, 172, 43, 217, 310/259, 179, 187, 189, 194; 318/750

[56] References Cited

U.S. PATENT DOCUMENTS

| | | | |
|---|---|---|---|
| 2,025,817 | 12/1935 | Lanz | 310/172 |
| 3,122,667 | 5/1961 | Baci? | 310/45 |
| 3,191,083 | 6/1965 | Meijer | |
| 3,975,654 | 8/1976 | Dryburgh | |

FOREIGN PATENT DOCUMENTS 565537 11/1958 Canada .
768349 5/1954 United Kingdom ................ 310/172

Primary Examiner—Peter S. Wong
Assistant Examiner—Matthew Nguyen
Attorney, Agent, or Firm—Rogers, Howell & Haferkamp

[57] ABSTRACT

A shading band for use in creating a shading pole in a shaded pole motor has tapered edges along its length, instead of the square cross-sectional edges with 90° inside angles of the prior art, in order to increase the thickness of epoxy deposited thereon which insulates the winding slot within which the shading band extends. The shading band may be formed with a cross-sectional shape of many different geometries, as long as its cross-sectional shape does not include inside angles less than 90°. The edge height for each shading band should be controlled in order to maintain an effective angle of transition from the wire slot sidewall tot he shading band of greater than about 90°.

22 Claims, 1 Drawing Sheet

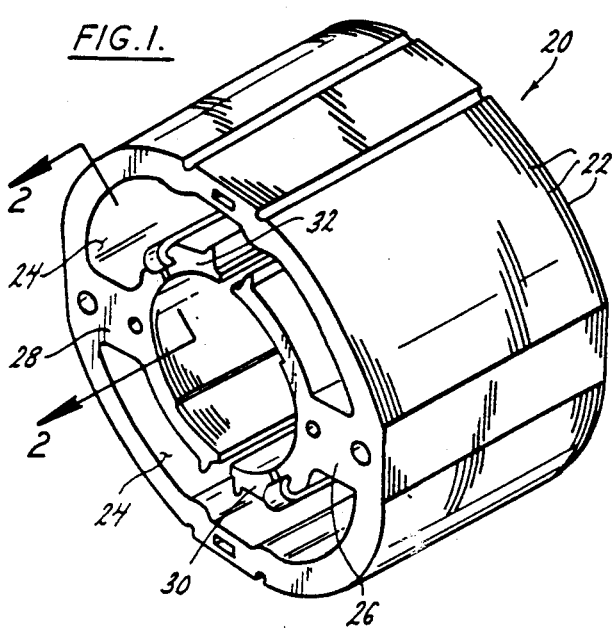
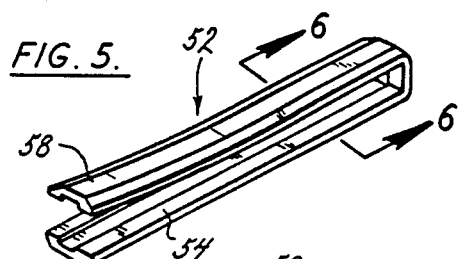
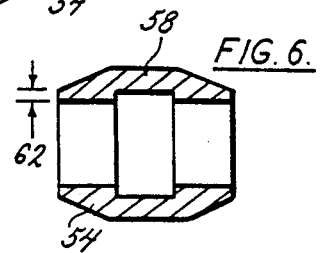
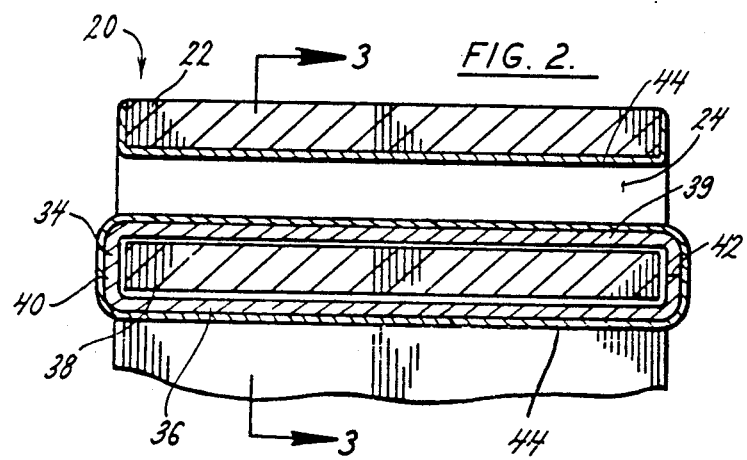
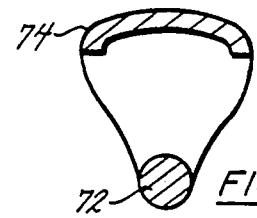
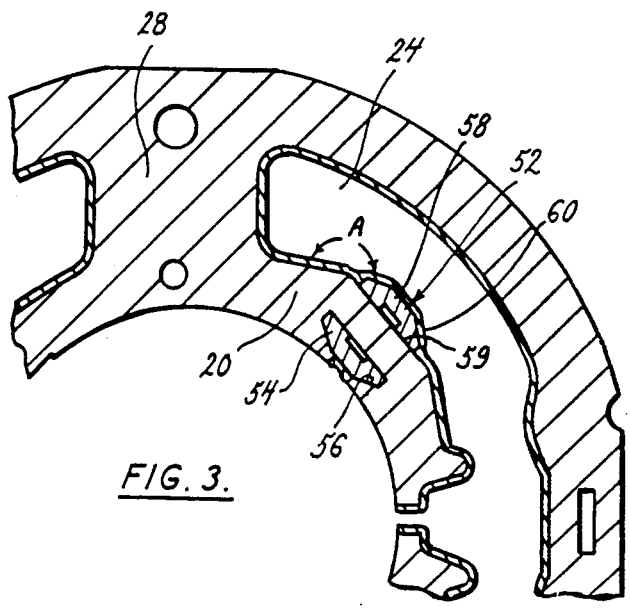
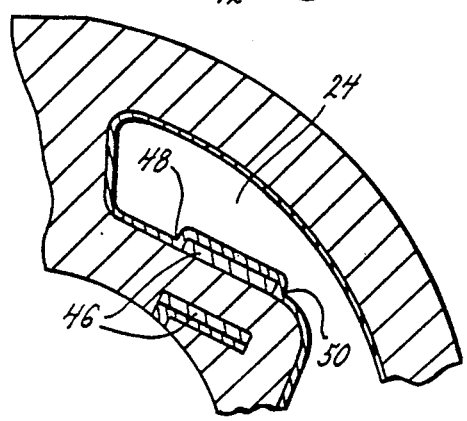

EPOXY COATED MOTOR WITH SHADING BAND HAVING TAPERED EDGES

BACKGROUND AND SUMMARY OF THE INVENTION

Shaded pole motors are well known in the art and are characterized by a shading pole which is used to develop the starting torque for the motor. The general construction of a shaded pole motor includes a stator which is comprised of a stack of laminations so designed as to provide pairs of main poles, pairs of shading poles, wire slots for the magnet wire, slots through which to wind the magnet wire, slots for the shading bands and the shading bands themselves. Shading bands are generally comprised of one or more turns of copper or other electrically conductive material inserted into the shading band slots and shorted together to create a high current low voltage inductor. When the alternating current, and therefore the flux field, are increasing, a portion of the flux cuts the shading coil. This establishes a current in it which sets up a flux opposing the main field flux. Hence, at this time, lines pass only through the unshaded sections of the poles.

During the time the main flux is at its maximum value, the shading coil is not being cut. Then no opposing flux is established, and as a result the main field flux also passes through the coil.

During the time the main flux is decreasing, an EMF is induced in the shading coil, causing a current to flow, which sets up a flux in the same direction as the main field flux. Hence, a high flux passes through the shading coil.

The effect of a shading coil then is to cause a flux to sweep across the pole faces from the unshaded to the shaded section of the pole producing a rotating magnetic field which provides starting torque for the rotor.

As a portion of the shading band extends through the wire slot, it must be insulated from the electrical conductors forming each main motor pole. In the prior art, slot liners are used and are made from Mylar or paper. These slot liners are inserted into the slots and physically separate the electrical conductors from both the core and shading band. Although this prior art construction performs adequately, with the development of newer epoxies and other plastic materials, much attention has been directed to epoxy coating the slots including the shading band using various epoxy coating techniques in place of the slot liners previously used. However, there has been significant problems encountered in successfully epoxy coating the shading band and the gap between it and the underlying sidewall of the core. The reasons for this vary depending upon the epoxy coating technique utilized.

In the hot melt epoxy coating process, the stator is pre-heated to a temperature of around 400° F. in an oven and then transferred to a coating station where the dry epoxy powder is sprayed onto those areas of the stator desired to be coated. As the powder settles onto the hot stator, it melts and flows into a continuous coating approximately 0.010 inches thick to create a smooth integral insulation which isolates the magnet wire extending through the slot from grounding against the steel stator. Unfortunately, the hot melt process tends to place a heavier coating on flat surfaces and a thinner coating on external corners and sharp edges. Since the magnet wire is wound over the sharp corners and edges forming the poles of the stator, the hot melt process deposits a minimum thickness at these very areas which increases the tendency for the magnet wire to wear the epoxy away and cause shorting to the core. As a partial remedy to this problem, several motor manufacturers have developed techniques for depositing excess amounts of powder on the corners and edges of the core to help minimize this tendency for the magnet wire to cut through the epoxy coating at those points.

Still another epoxy coating process is the electrostatic process in which the steel stator is not pre-heated at all but is instead placed in a fixture where it is electrically grounded to the frame of an epoxy coating machine. Typically, dry epoxy powder is floated in a fluidized bed and is ionized to create a 50,000 volt to 60,000 volt static charge. When the stator is positioned over this fluidized bed of ionized powder, the voltage potential therebetween creates an electrostatic charge which builds along the surfaces of the steel stator and causes the powder to stick to the stator by electrostatic deposition. The stator is then passed through an oven where the powder is melted and adheres to the stator in accordance with the relative thickness of powder distributed thereover. Since the electrostatic charge, and therefore the powder buildup, is naturally heavier on external corners and edge surfaces than on flat surfaces, this process naturally results in a heavier coating on the corners and edges than in the hot melt coating process. Consequently, the electrostatic epoxy coating process is generally considered much more desirable for use in insulating stator cores for shaded pole motors, as well as other electromagnetic devices.

Although electrostatic epoxy coating concentrates a heavier buildup on corners and edges, it is not as successful in applying an even coating to tight inside corners (about 90° or less), or in bridging physical gaps between adjacent surfaces such as might be present between the edge of a shading band and the sidewall of the wire slot. As it is very common in the industry to use standard copper or other electrically conductive wire stock to form a shading band, the angles generally formed between the edges of the shading band and the wire slot sidewall are less than about 90°. This is because standard copper wire stock typically comes in cross-sectional areas formed in the shape of a circle, square, rectangle, or flat with curved edges. The practice in the industry is to use copper wire stock as it comes from the drawing dies to form the shading band. In the prior art where paper and Mylar slot liners have been used, the shape of the shading band was of little consequence as the slot liner could be formed in such a way as to accommodate the particular copper wire shape used and still achieve a good insulation between the magnet wire and the shading band. However, with epoxy coating techniques, great difficulty has been encountered in achieving good deposition at the edge of the shading band adjacent the wire slot sidewall both because of the sharp angle therebetween and also the tendency of the shading band to "gap" away from the sidewall, especially in taller cores for larger motor sizes.

To solve these and other problems in the prior art, the inventor herein has succeeded in designing and developing a shading band with tapered edges and with a reverse bend formed in the shading band prior to its fixation to the core. This new design serves to virtually eliminate the gap between the shading band and the wire slot sidewall and also creates an effective angle between the edge of the shading band and the slot sidewall greater than about 90° to thereby equalize the electrostatic charge buildup across the transition. The equalized charge also equalizes the electrodeposition of epoxy powder thereon to create a finished coat of epoxy having a more uniform thickness thereacross to thereby satisfactorily insulate the shading band and wire slot. As the inventive concept generally includes increasing the effective angle between the shading band and the wire slot sidewall, there are a multitude of shapes which the shading band can take and yet still achieve the purposes of the present invention. As is well known in the art, the electromagnetic effect created by the shading band is dependent upon the total cross-sectional area of the shading band which extends through the slot while the particular shape of the shading band has little effect. Consequently, various shapes are available for use including shading bands having a cross-sectional shape of a trapezoid, triangle, chord, hemisphere, or even odd compound angled shapes. Because of the physical limitations of the copper, and in order to preserve the structural integrity of the shading band, an upstanding edge is formed along the side edges where the shading band contacts the wire slot sidewall. This edge height should be controlled in order to control the effective angle formed between the shading band and the wire slot sidewall. This ensures that the electrostatic charge built up across the transition is increased which thereby results in an increased epoxy coating.

The inventor's solution to this difficult problem can be implemented by readily reforming those shading bands generally created in the prior art. Additional forming steps can be used to reshape the profile of the raw stock used to form a shading band at minimal expense such that both legs of the shading band are tapered and profiled into the same shape. Alternately, only one leg may be tapered and the other leg remains in a standardized shape for close fitting through a mounting slot in the stack of laminations and which is used to physically mount the shading band to the core. In this form, the present invention may be readily implemented without redesigning core slots in stator laminations or tools and dies used to form stator laminations.

While the principal advantages and features of the present invention have been described above, a greater understanding of the invention may be attained by referring to the drawings and description of the preferred embodiment which follow.

BRIEF DESCRIPTION OF THE DRAWINGS

FIG. 1 is a perspective view of a stator for an electric motor with the shading pole comprising the shading band installed therein;

FIG. 2 is a partial cross-sectional view taken along the plane of line 2—2 in FIG. 1 and detailing the shading band with its epoxy coating;

FIG. 3 is a partial cross-sectional view taken along the plane of line 3—3 in FIG. 2 further detailing the shading band of the present invention extending through the wire slot with an epoxy coating covering the wire slot and shading band;

FIG. 4 is a partial cross-sectional view of a stator core showing a shading band in the prior art with reduced epoxy coating at the edges of the shading band;

FIG. 5 is a perspective view of a shading band of the present invention;

FIG. 6 is a partial cross-sectional view taken along the plane of line 6—6 in FIG. 5 and detailing the cross-sectional profile of the shading band of the present invention;

FIG. 7 is a partial cross-sectional view detailing another embodiment having a different cross-sectional shape;

FIG. 8 is a partial cross-sectional view of another embodiment of the present invention having a different cross-sectional shape;

FIG. 9 is a partial cross-sectional view of another embodiment of the present invention with a different cross-sectional shape;

FIG. 10 is a partial cross-sectional view of another embodiment of the present invention having a different cross-sectional shape; and FIG. 11 is a partial cross-sectional view of another embodiment of the present invention formed from round wire.

DETAILED DESCRIPTION OF THE PREFERRED EMBODIMENT

A stator 20 for an epoxy coated motor is shown in FIG. 1 and is comprised of a plurality of ferromagnetic laminations 22 which are stacked atop each other and welded to form the core 20, as is well known in the art. The shape of the laminations 22 and, thus, core 20 form a pair of wire winding slots 24 which extend through the core 20 and within which magnet wire (not shown) is wound about the poles 26, 28, for a two pole motor as is well known in the art. In order to provide starting torque, a shading pole 30, 32 is formed adjacent each pole 26, 28 by a shading band 34, as shown in FIG. 2. The shading band consists of a length of copper or other electrically conductive material which has one leg 36 extending through an elongated slot 38 in core 20 and a second leg 39 extending through the winding slot 24. The two legs 36, 39 are connected by a connecting end portion 40 at one end and are folded over and welded to each other at the other end 42. A layer of epoxy 44 is desirably formed within wire winding slots 24, over the outside faces of core 20, and over shading poles 30, 32 (FIG. 1) in order to insulate it from the magnet wire (not shown) wound through slots 24.

As shown in FIG. 4, a prior art shading band 46 is generally made from a flat, rectangular piece of copper, or the like, such that the epoxy coating 48, 50 which forms at the edge of shading band 46 is of substantially reduced thickness and is thereby susceptible to separation, and partial contact with magnet wire wound within wire slot 24 which can cause shorts to ground and premature failure of the shaded pole motor. Additionally, although not shown in FIG. 4, shading bands 46 of the prior art had a tendency to pull away from the sidewall of wire slot 24 to thereby create a gap which was incapable of being bridged by epoxy coating, thereby rendering the finished stator unacceptable.

The present invention includes a shading band 52 as shown in FIG. 3 in cross-section and in FIGS. 5–10. As shown in FIG. 3, the shading band 52 has an elongated leg 54 which extends through a slot 56 within core 20 and an upper leg 58 which extends through wire slot 24, both of which have a cross-sectional shape approximating that of a trapezoid. This cross-sectional shape produces an effective angle A greater than 90° which dramatically improves the thickness of the epoxy layer 60 formed at the edges of upper leg 58.

As shown in FIGS. 5 and 6, the upper leg 58 has a reverse bend impressed therein which helps to snug upper leg 58 against the sidewall 59 of winding slot 24 to eliminate any gaps such as those commonly found with prior art shading bands. As shown in FIG. 6, the cross-sectional shape of the upper leg 58 approximates a trapezoid and has an edge height 62 whose dimension, preferably, is 0.030 inches maximum for fractional horsepower motors. Functionally, edge 62 height should be controlled in order to ensure uniform formation of the epoxy coating at the transition between the sidewall of the stator wire slot and the shading band. This dimension varies with the size of the stator and, thus, the curvature of the inner sidewall of the wire slot. In concept, the height of edge 62 is controlled in order to achieve an effective angle between the wire slot sidewall and the shading band which is greater than about 90°. Should the dimension of edge 62 be too great, then the epoxy coating "sees" an inside angle of 90° such as that experienced in the prior art and shown in FIG. 4 which would lead to a decreased thickness of epoxy coating at the edges of the shading band.

As the electrical performance of the shading band is dependent upon the total cross-sectional area of the shading band, and is virtually independent of the particular shape of that cross-sectional area, additional cross-sectional shapes perform equally as well. For example, FIG. 7 shows an embodiment 64 generally comprised of a chord which can approach a hemisphere. As shown in FIG. 8, a shading band 66 having a generally triangular cross-sectional shape may also be used. As shown in FIG. 9, a shading band 68 having a generally curvilinear shape may be used. As shown in FIG. 10, a shading band 70 having a compound angled shape may also be used, as long as the shape does not employ inside corners less than 90°. Lastly, as shown in FIG. 11, any of these shading bands may be formed from round wire such that the leg 72 and slot (not shown) are round. The upper leg 74 may be more like a hemisphere, as shown.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. In a core for an electromagnetic device, the core including means defining at least one wire slot opening through which electrical conductors are wound to thereby create an electromagnetic field, the improvement comprising a shading pole consisting of a shading band which extends at least partially through said slot opening and abutting a sidewall thereof, said shading band having tapered edges to thereby increase an effective angle between said sidewall and said shading band to greater than about 90°.

2. The device of claim 1 wherein the cross-sectional area of said shading band is substantially in the shape of a trapezoid.

3. The device of claim 1 wherein the cross-sectional area of said shading band is substantially in the shape of a chord.

4. The device of claim 1 wherein the cross-sectional area of said shading band is substantially in the shape of a triangle.

5. The device of claim 1 wherein the cross-sectional area of said shading band is substantially in the shape of a hemisphere.

6. The device of claim 1 wherein the core includes an elongated slot extending substantially parallel to the wire slot opening, the shading band including a first leg for extending through the elongated slot and a second leg for extending through the wire slot opening, and wherein at least the second leg has said tapered edges.

7. The device of claim 6 further comprising an epoxy coating covering said shading band second leg and wire slot opening to thereby electrically insulate them from the electrical conductors wound therethrough.

8. The device of claim 1 wherein the core includes a round hole extending substantially parallel to the wire slot opening, the shading band including a first leg for extending through the round hole and a second leg for extending through the wire slot opening, and wherein at least the second leg has tapered edges.

9. The device of claim 8 further comprising an epoxy coating covering said shading band second leg and wire slot opening to thereby electrically insulate them from the electrical conductors wound therethrough.

10. In an epoxy insulated shaded pole motor, the motor having a stator core comprised of a plurality of stacked laminations, said core having at least one wire slot through which a plurality of electrical conductors are wound, the improvement comprising a shading pole including a shading band, extending through the wire slot, said shading band having tapered edges to thereby facilitate the epoxy coating of the wire slot and shading band and electrically insulate them from said electrical conductors.

11. The device of claim 10 wherein said tapered edges provide an effective angle of greater than about 90° with the sidewall of said wire slot.

12. The device of claim 11 wherein the core has an elongated opening therethrough, said shading band including an extension for extending through said opening to thereby secure said shading band to the core.

13. The device of claim 12 wherein the shading band has a reverse bend impressed therein to thereby improve its fit against the sidewall of the wire slot.

14. The device of claim 12 wherein the tapered edges have means for substantially equalizing the electrostatic charge across the transition with the sidewall of the wire slot to thereby facilitate the electrodeposition of epoxy thereon as the motor is epoxy coated.

15. The device of claim 14 wherein the shading band has a cross-sectional shape approximating a trapezoid.

16. The device of claim 14 wherein the shading band has a cross-sectional shape approximating a chord.

17. The device of claim 14 wherein the shading band has a cross-sectional shape approximating a triangle.

18. The device of claim 14 wherein the shading band has a cross-sectional shape approximating a hemisphere.

19. In an epoxy insulated shaded pole motor, the motor having a stator core comprised of a plurality of stacked laminations, said core having at least one wire slot opening through which a plurality of electrical conductors are wound, the improvement comprising a shading pole including a shading band extending through the wire slot opening, said shading band having means for substantially increasing the electrostatic charge across its transition with the sidewall of said slot opening to thereby facilitate the effective epoxy coating of said slot opening and shading band.

20. The device of claim 19 wherein the charge increasing means comprises tapered edges.

21. The device of claim 20 wherein the effective angle between the sidewall of said wire slot opening and said shading band is greater than about 90°.

22. The device of claim 21 wherein the shading band has a reverse bend therein prior to its attachment to the core, said reverse bend thereby snugging said shading band to the sidewall of the wire slot opening.

* * * * *